United States Patent
Ogura et al.

(10) Patent No.: US 9,667,853 B2
(45) Date of Patent: May 30, 2017

(54) IMAGE-CAPTURING APPARATUS

(71) Applicant: Panasonic Intellectual Property Management Co., Ltd., Osaka (JP)

(72) Inventors: Motonori Ogura, Osaka (JP); Mitsuyoshi Okamoto, Osaka (JP); Shigenori Yatsuri, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/540,297

(22) Filed: Nov. 13, 2014

(65) Prior Publication Data

US 2015/0138430 A1 May 21, 2015

(30) Foreign Application Priority Data

Nov. 19, 2013 (JP) .................................. 2013-238474
Oct. 27, 2014 (JP) .................................. 2014-217959

(51) Int. Cl.
H04N 5/232 (2006.01)
(52) U.S. Cl.
CPC ....... *H04N 5/23212* (2013.01); *H04N 5/2328* (2013.01); *H04N 5/23296* (2013.01)
(58) Field of Classification Search
CPC ........ H04N 5/23212; G02B 7/28; G01C 3/00; G01C 3/02; G03B 13/20
See application file for complete search history.

(56) References Cited

U.S. PATENT DOCUMENTS 4,908,505 A 3/1990 Taniguchi et al.
4,965,840 A * 10/1990 Subbarao .............. G01C 3/085
356/12
8,599,243 B2 * 12/2013 Okada .................. G11B 27/322
348/46

FOREIGN PATENT DOCUMENTS

JP   63-286811    11/1988
JP   2007-271983  10/2007
JP   2011-015163  1/2011

* cited by examiner

Primary Examiner — Twyler Haskins
Assistant Examiner — Angel L Garces-Rivera
(74) Attorney, Agent, or Firm — Wenderoth, Lind & Ponack, L.L.P.

(57) ABSTRACT

The present disclosure provides an image-capturing apparatus for determining an object distance with higher accuracy. An image-capturing apparatus includes an optical system that forms an object image of an object, the optical system including a focus lens, an image sensor that captures the object image formed via the optical system and generates image data, and a controller that determines an object distance according to information representing a state of the optical system based on (i) first image data generated when the focus lens is at a first focus lens position and (ii) second image data generated when the focus lens is at a second focus lens position.

6 Claims, 6 Drawing Sheets

IMAGE-CAPTURING APPARATUS

TECHNICAL FIELD

The present disclosure relates to an image-capturing apparatus.

BACKGROUND ART

Japanese Patent Laid-Open Publication No. 2011-15163 discloses an image-capturing apparatus that employs a system of depth From Defocus (DFD) method. This image-capturing apparatus implements a focus control that obtains plural defocusing, and includes an image-capturing device for capturing plural images defocusing differently from each other. The image-capturing apparatus then determines an object distance based on the plural images defocusing differently from each other. The image-capturing apparatus performs the focus control based on the determined object distance.

SUMMARY

It is expected that employment of a Depth From Defocus (DFD) method increases a speed of focusing on an object. On the other hand, the employment of the DFD method requires further improvement of accuracy. The present disclosure provides an image-capturing apparatus for determining an object distance with higher accuracy.

The image-capturing apparatus in the present disclosure includes an optical system that forms an object image of an object, the optical system including a focus lens, an image sensor that captures the object image formed via the optical system to generate image data, and a controller that determines an object distance according to information representing a state of the optical system based on (i) first image data generated when the focus lens is at a first focus lens position and (ii) second image data generated when the focus lens is at a second focus lens position.

The present disclosure can provide the image-capturing apparatus for determining an object distance with higher accuracy.

DETAIL DESCRIPTION OF PREFERRED EMBODIMENT

An exemplary embodiment of the present disclosure will be detailed below with reference to the accompanying drawings. An excessive description is omitted. For instance, a description of a well-known subject in a public domain is omitted, or a description of a similar element to that discussed previously is omitted for avoiding redundancy and facilitating an ordinary skilled person in the art to understand the present disclosure.

The inventors provide the accompanying drawings and the description for the ordinary skilled person in the art to fully understand the disclosure, so that these materials may not limit the scope of the claims.

A number of methods for measuring an object distance, a distance from an image-capturing apparatus to an object includes a depth from Defocus (DFD) method that utilizes correlation values of defocusing amounts generated in image captured with a camera. In general, a defocusing amount is uniquely determined for each image-capturing apparatus in response to a relation between a focal position and the object distance. In the DFD method utilizing the above characteristics, two images having different defocus amounts are produced, and the object distance is measured based on a point-spread function (PSF) and a difference in the defocusing amounts. The image-capturing apparatus in accordance with this embodiment measures the object distance by utilizing the DFD calculation to perform an auto-focus control.

A structure and operation of the image-capturing apparatus in accordance with the embodiment will be described below.

1. Electrical Structure of Image-Capturing Apparatus

Figure 1:
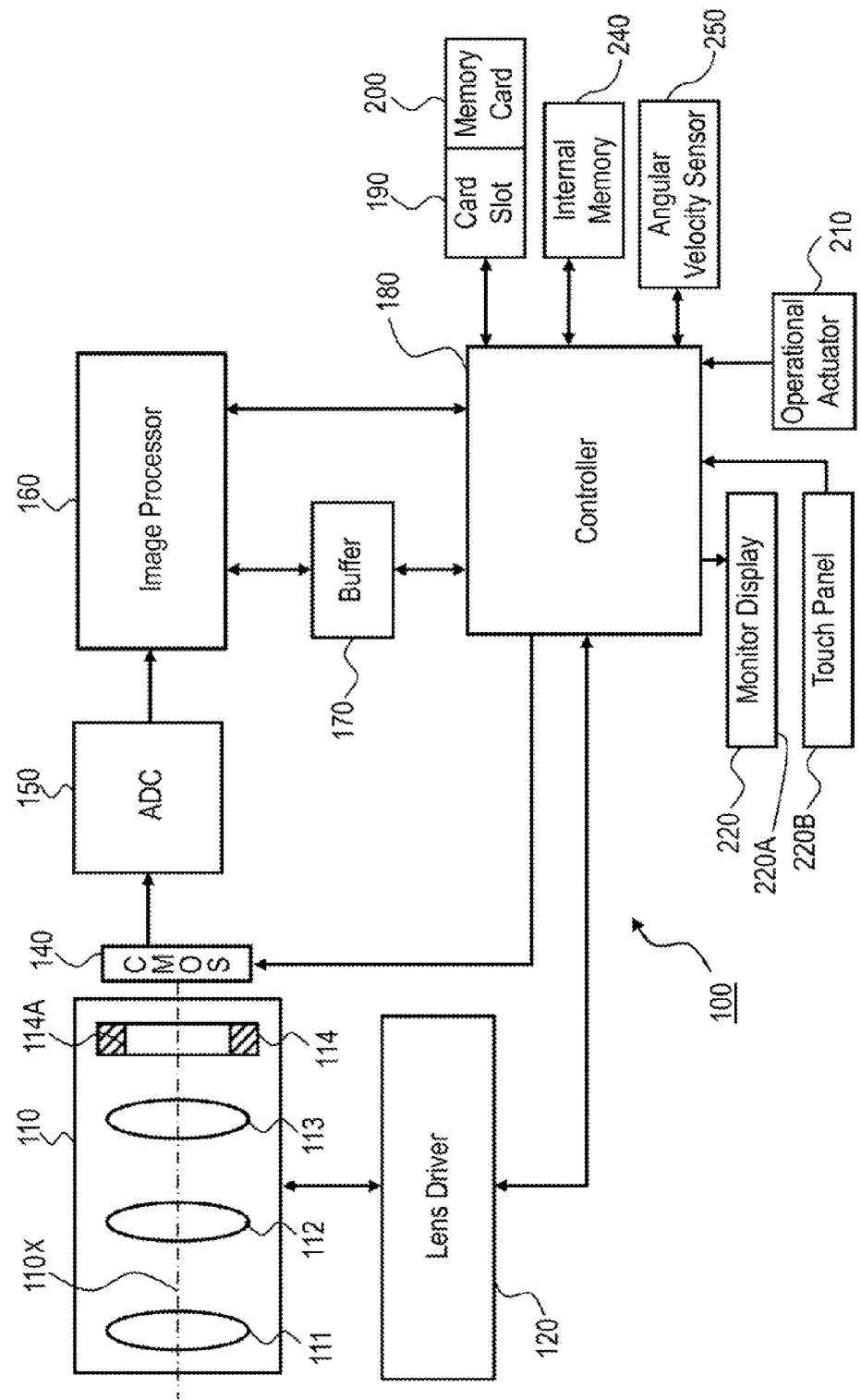
FIG. 1 is a block diagram of a digital video camera in accordance with an exemplary embodiment for illustrating an electrical structure of the digital video camera.

FIG. 1 is a block diagram of digital video camera 100, an image-capturing apparatus in accordance with the embodiment, for illustrating an electrical structure of digital video camera 100. Digital video camera 100 includes optical system 110 including at least one lens. Optical system 110 forms an object image on CMOS image sensor 140 by utilizing light from an object. The object image is captured with an image sensor, CMOS image sensor 140. CMOS image sensor 140 produces image data based on the captured object image. The image data produced by CMOS image sensor 140 is converted into a digital signal with ADC 150, and processed with image processor 160. The digital signal is stored in memory card 200. The structure of digital video camera 100 will be detailed below.

Optical system 110 in accordance with the embodiment includes zoom lens 111, camera-shake correcting lens 112, focus lens 113, and iris 114. Zoom lens 111 moves along optical axis 110X to enlarge and reduce the object image. Focus lens 113 moves along optical axis 110X to adjust a focus of the object image. Camera-shake correcting lens 112 is movable within a plane perpendicular to optical axis 110X of optical system 110. Camera-shake correcting lens 112 moves along a direction in which a shake of digital video camera 100 is cancelled as to reduce an influence caused by the shake of camera 100 on the captured image. Iris 114 has opening 114A therein disposed on optical axis 110X, and adjusts the size of opening 114A automatically or according to a user's setting, so that iris 114 can adjust an amount of light transmitting through iris 114.

Lens driver 120 includes a zoom actuator that drives zoom lens 111, a camera-shake correcting actuator that drives camera-shake correcting lens 112, a focus actuator that drives focus lens 113, and an iris actuator that drives iris 114. Lens driver 120 controls the zoom actuator, the camera-shake correcting actuator, the focus actuator, and the iris actuator.

CMOS image sensor 140 captures the object image formed by optical system 110, and produces analog image data in form of an analog signal. Image sensor 140 performs various operations, such as exposure, transfer, and electronic shutter.

A/D converter 150 converts the analog image data produced by CMOS image sensor 140 into digital image data in form of a digital signal.

Image processor 160 processes the image data produced by CMOS image sensor 140 to produce image data to be displayed on monitor display 220 and to produce image data to be stored in memory card 200. For instance, image processor 160 performs a gamma correction, a white-balance correction, and a flaw correction on the image data produced by CMOS image sensor 140. Image processor 160 compresses the image data produced by CMOS image sensor 140 by a compression method in accordance with H.264 standard or MPEG2 standard. Image processor 160 may be implemented by a DSP or a microprocessor.

Controller 180 controls entire digital video camera 100, and can be implemented by a semiconductor element. Controller 180 can be implemented by hardware, or by a combination of hardware and software. Controlled may be implemented by a microprocessor.

Buffer 170 functions as a working memory of image processor 160 and controller 180, and can be implemented by, e.g. a DRAM or a ferroelectric memory.

Card slot 190 holds memory card 200 detachably, and is mechanically or electrically connectable to memory card 200. Memory card 200 contains a flash memory or a ferroelectric memory therein, and stores data, such as an image file produced in image processor 160.

Internal memory 240 is implemented by a flash memory or a ferroelectric memory, and stores a control program that controls entire digital video camera 100. Internal memory 240 also stores point spread functions (PSFs).

Operational actuator 210 includes user interfaces, such as a cross key, an enter-button, for accepting operations by users.

Monitor display 220 has screen 220A that displays thereon an image indicated by the image data produced by CMOS image sensor 140 and an image indicated by the image data read out from memory card 200. Monitor display 220 displays various menus for setting functions of camera 100 on screen 220A. Touch panel 220B is disposed on screen 220A. Touch panel 220B is touched by a user for receiving various touch actions. An instruction entering through touch panel 220B as a touch action is supplied to controller 180 to be processed.

Angular velocity sensor 250 detects an angular velocity produced in digital video camera 100 due to a camera shake. The angular velocity detected by sensor 250 is supplied to controller 180. Controller 180 drives camera-shake correcting lens 112 to cancel a camera shake produced in digital video camera 100 due to the angular velocity.

2. Operations of Digital Video Camera 100

Figure 2:
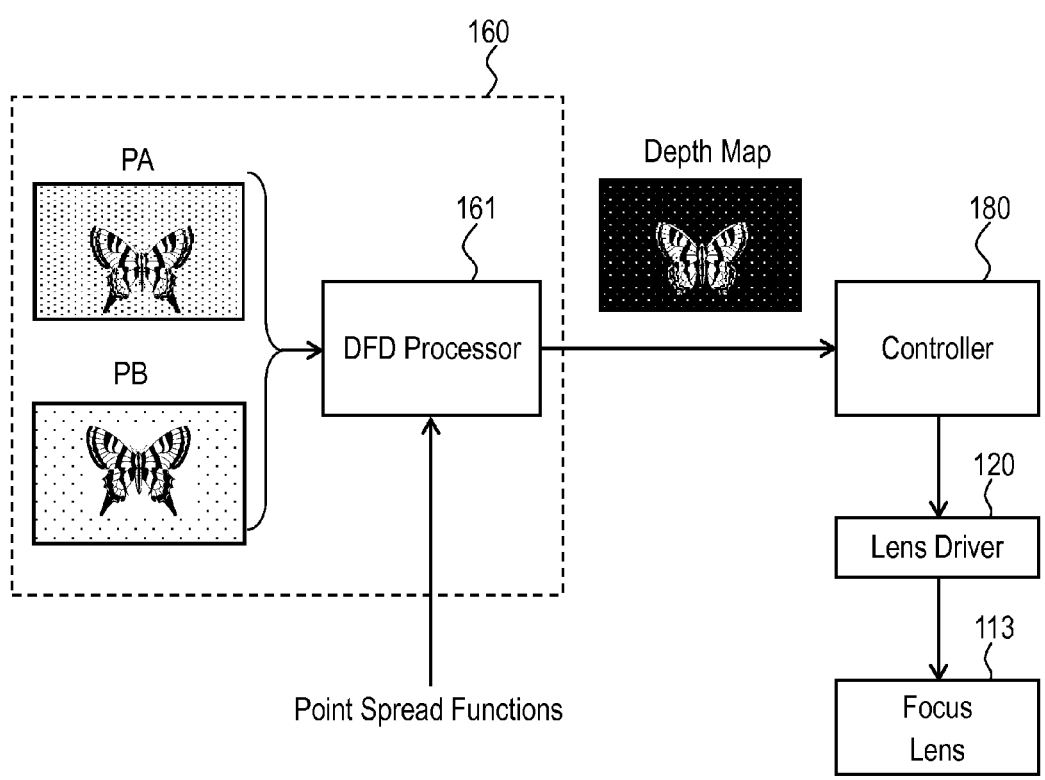
FIG. 2 is a block diagram of the digital video camera in accordance with the embodiment for illustrating an operation of the digital video camera.

Digital video camera 100 performs an auto-focus operation utilizing a result of the DFD calculation. FIG. 2 is a block diagram of digital video camera 100 for illustrating a control of the focus lens by utilizing the result of the DFD calculation.

DFD processor 161 is disposed in image processor 160, and performs the DFD calculation to produce a depth map. To be more specific, DFD processor 161 uses two images: observed image PA and reference image PB having different defocusing amounts produced intentionally by changing focal positions. DFD processor 161 produces the depth map based on observed image PA, reference image PB, and point spread functions (PSFs). The depth map indicates object distances at respective ones of pixels of observed image PA (reference image PB).

Then, DFD processor 161 supplies the depth map to controller 180. Controller 180 controls lens driver 120 as to drive focus lens 113 based on the depth map.

The DFD calculation performed by DFD processor 161 shown in FIG. 2 and the determination of the object distance by controller 180 will be detailed below.

Figure 3:
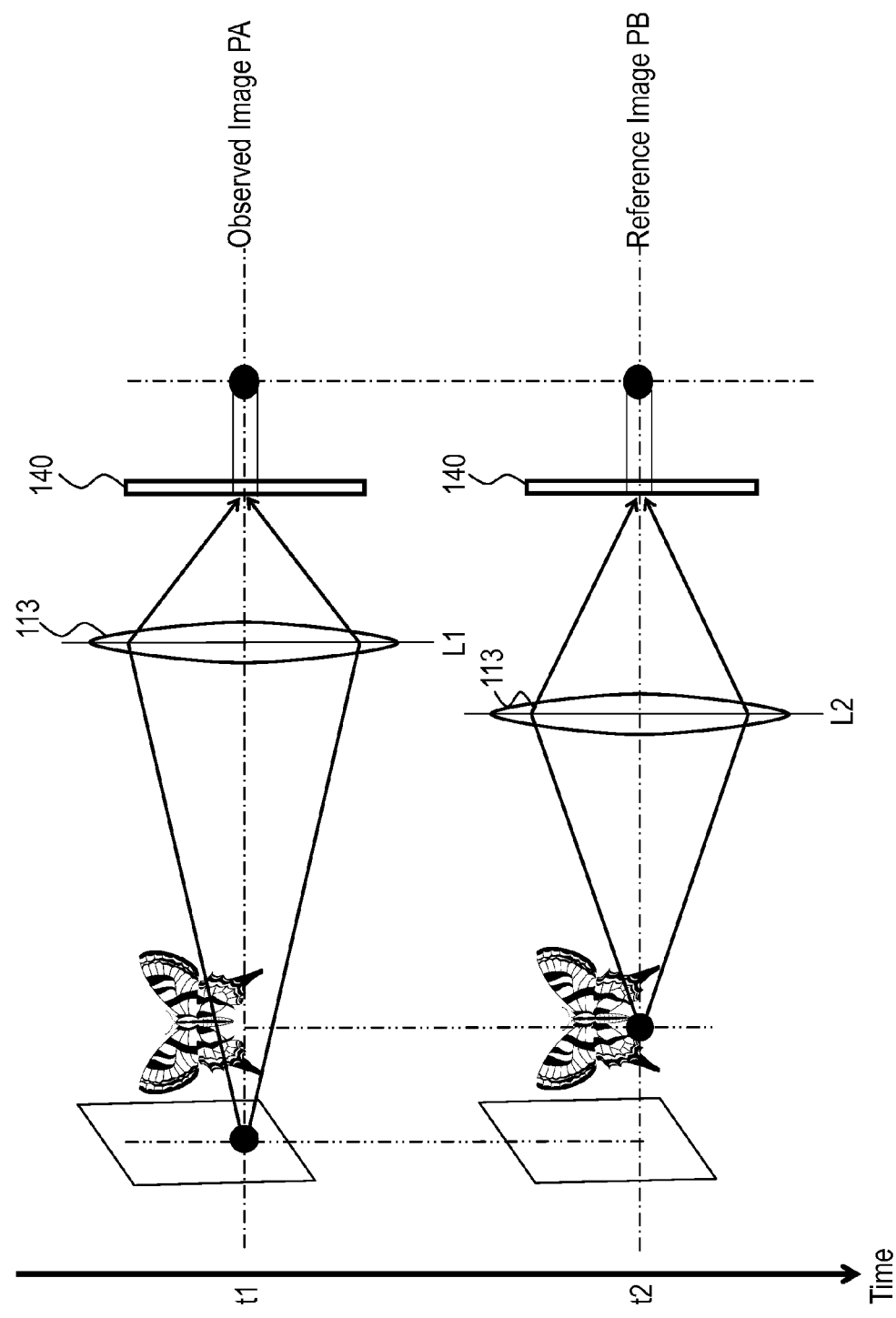
FIG. 3 is a schematic view of the operation of the digital video camera in accordance with the embodiment.

First, the DFD calculation performed by DFD processor 161 will be detailed. FIG. 3 is a schematic view of focus lens 113 of digital video camera 100 in accordance with the embodiment for illustrating the movement of focus lens 113 for the DFD calculation. Controller 180 changes a focal position based on the DFD calculation to intentionally produce two images having different defocusing amounts. To be more specific, as shown in FIG. 3, controller 180 controls lens driver 120 to locate focus lens 113 at focusing position L1 at time point t1. Similarly, focus lens 113 is located at focusing position L2 different from focusing position L1 at time point t2. CMOS image sensor 140 captures an image of the object when focus lens 113 is positioned at focusing position L1 for producing observed image PA. Similarly, image sensor 140 captures the image of the object when focus lens 113 is positioned at focusing position L2 for producing reference image PB. Although being produced by capturing the same object, images PA and PB have defocusing amounts different from each other due to different positions of focus lens 113 for the capturing.

Figure 4:
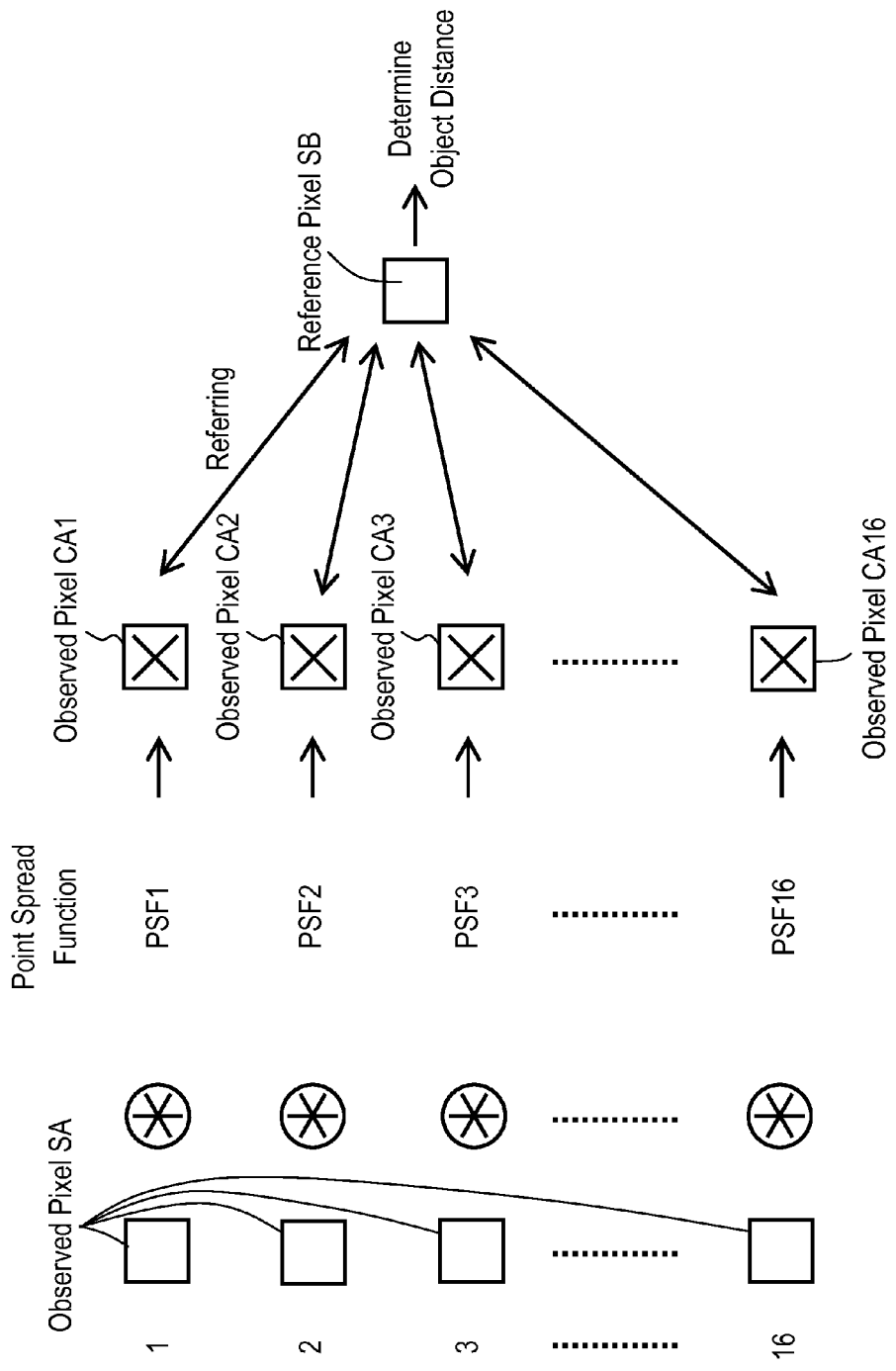
FIG. 4 is a schematic view of a DFD calculation executed by the digital video camera in accordance with the embodiment.

FIG. 4 is a schematic view for illustrating the calculation of the object distance by utilizing the DFD calculation performed by digital video camera 100 in accordance with the embodiment. DFD processor 161 performs the DFD calculation on observed pixels SA constituting observed image PA and reference pixels SB constituting reference image PB to determine the distances from respective ones of pixels SA (SB). DFD processor 161 produces plural observed pixels CA by convolutions of plural PSFs with observed pixels SA. DFD processor 161 compares plural observed pixels CA with reference pixels SB located at the same coordinates as pixels CA on the image. The above operation will be detailed below.

A point spread function (PSF) indicates a response to a point light source of an optical system, and indicates a change in a defocusing amount. A convolution of the PSF with an image corresponding to a combination of point light sources can intentionally produce a defocused image. According to the embodiment, a large number of point spread functions corresponding to a large number of distances to an object are previously provided in internal memory 240. Controller 180 separates distances to an object into sixteen steps, namely from the closest point to the farthest point, and selects sixteen point spread functions PSF1 to PSF16 corresponding to the sixteen steps out of the large number of point spread functions stored in internal memory 240. Controller 180 then supplies selected point spread functions PSF1 to PSF16 to DFD processor 161.

DFD processor 161 performs convolutions of point spread functions PSF1 to PSF16 with observed pixels SA as to produce sixteen observed pixels CA1 to CA16 corresponding to the object distances at respective ones of observed pixel SA. Since observed pixels CA1 to CA16 have point spread functions different from each other for convolution, observed pixels CA1 to CA16 form different defocused images.

DFD processor 161 then compares observed pixels CA1 to CA16 with reference pixel SB, and selects observed pixel CAn that has the smallest difference from reference pixel SB among observed pixels CA1 to CA16. DFD processor 161 determines the object distance corresponding to the point spread function for convolution producing observed pixel CAn as the distance to the object at observed pixel SA. For instance, if the difference between observed pixel CA3 and reference pixel SB is smaller than differences between reference pixel SB and each of other observed pixels CA1 to CA2, CA4 to CA16, then, DFD processor 161 determines that an object distance corresponding to point spread function PSF3 for convolution with observed pixel SA to produce observed pixel CA3 is the object distance at observed pixel SA. DFD processor 161 outputs distance data corresponding to the determined object distance.

DFD processor 161 performs the above operation on each observed image PA and reference image PB as to produce a depth map plotting respective object distances at the pixels. According to the embodiment, since sixteen point spread functions corresponding to distances to the object are used, the depth map exhibits sixteens levels of the object distances.

Detailed determination of a distance to an object using controller 180 is described. Controller 180 determines a reliable region R in distribution of the object distance shown on a Depth map according to a state of optical system 110 in the determination of the object distance.

Not all values of the distance to the object shown on the Depth map completed by DFD calculation circuit 161 are reliable. The determination is occasionally that the same distances to the object are different from each other from results of the DFD calculation depending on the state of optical system 110. This is because a defocusing amount changes due to a factor other than the object distance according to the state of optical system 110.

Figure 5A:
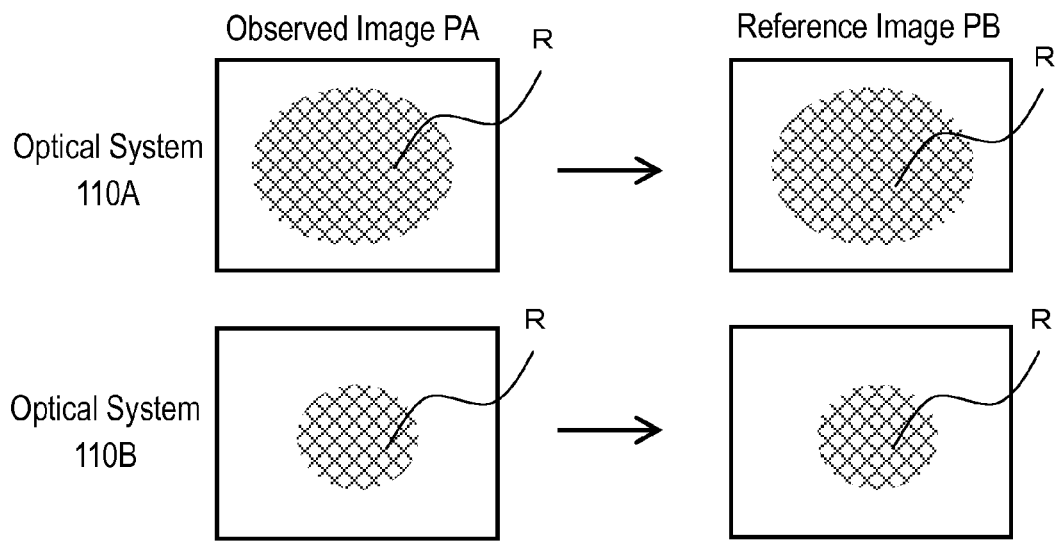
FIGS. 5A to 5C are a schematic view of a region where a DFD calculation result is reliable on a digital video camera in accordance with the embodiment.
Figure 5B:
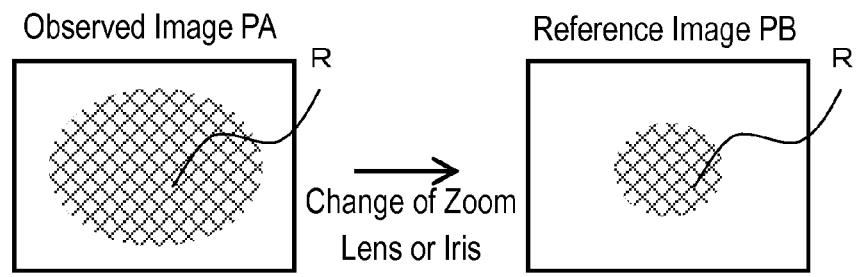
Figure 5C:
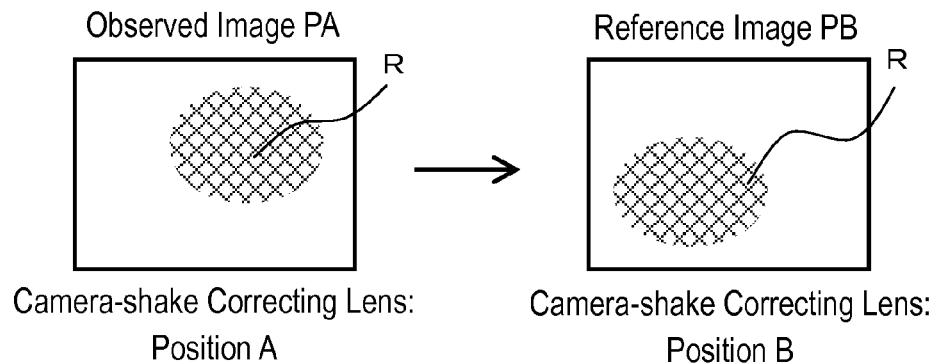

A reason for the change in the defocusing amount is described with reference to FIG. 5A to FIG. 5C. FIG. 5A to FIG. 5C are schematic views of a change in the region R, where the DFD calculation result is reliable, according to the state of the optical system. Ranges indicated by hatching in FIG. 5A to FIG. 5C are the reliable region R.

A first case is a case where the change in the defocusing amount is caused by resolution of optical system 110 provided to digital video camera 100. When a combination of lens groups composing optical system 110 varies, the resolution of optical system 110 varies. An example shown on an upper section in FIG. 5A illustrates a case of high-resolution optical system 110A composed of a high-resolution lens group, and an example shown on a lower section of FIG. 5A illustrates a case of low-resolution optical system 110B composed of a low-resolution lens group. In general, the resolution near a center of a captured image is high, and the resolution becomes lower as approaching a periphery of the captured image. For this reason, the defocusing amount near the center of the captured image is comparatively reliable, but the reliability of the defocusing amount is comparatively low on the periphery of the captured image because of convolution of the defocusing amount caused by the low resolution besides the net defocusing amount. As shown in FIG. 5A, reliable region R in high-resolution optical system 110A tends to be larger than reliable region R of low-resolution optical system 110B. Since the resolution is basically the same as each other in the same type of optical systems 110, as shown in FIG. 5A, a position of reliable region R does not greatly differ in observed image PA and reference image PB. However, when positions of the focus lenses are different, the resolution can slightly differ. For this reason, controller 180 determines that a region, which is set according to information that represents the state of optical system 110 including optical characteristics of the resolution on both observed image PA and reference image PB used for completion of the Depth map, is a region that satisfies a predetermined standard as detection accuracy of the object distance, namely, reliable region R.

A second case is a case where positions of iris 114 and zoom lens 111 change during moving of focus lens 113 in order to perform DFD calculation. As shown in FIG. 5B, when the positions of iris 114 and zoom lens 111 change during the moving of focus lens 113 for the DFD calculation, the resolution varies in observed image PA and reference image PB, and reliable region R changes. That is to say, the resolution changes more than a result of convolving a point spread function with observed image PA. In general, an amount of change in the resolution becomes larger as approaching from the center to the periphery of the captured image. For this reason, the defocusing amount near the center of the captured image is comparatively reliable, but the reliability of the defocusing amount is comparatively low on the periphery of the captured image because of convolution of the defocusing amount caused by the low resolution with the net defocusing amount. When the positions of iris 114 and zoom lens 111 change during the moving of focus lens 113 for the DFD calculation, the position of reliable region R greatly differs in observed image PA and reference image PB. For this reason, controller 180 determines that the region, which is set according to information that represents the state of optical system 110 including the positions of iris 114 and zoom lens 111 on both observed image PA and reference image PB used for the completion of the Depth map, is the region that satisfies the predetermined standard as the detection accuracy of the object distance, namely, reliable region R.

A third case is a case where a position of camera-shake correcting lens 112 changes during the moving of focus lens 113 for the DFD calculation. Camera-shake correcting lens 112 moves to a direction vertical to optical axis 110X of optical system 110, so as to cancel a shake with respect of the captured image. At this time, as to light that is incident along optical axis 110X of optical system 110, an incident position with respect to camera-shake correcting lens 112 changes according to the transfer of camera-shake correcting lens 112. In general, a lens can image light incident from a lens center portion with comparatively high resolution, and can image light incident from a lens peripheral portion with comparatively low resolution. For this reason, for example as shown in FIG. 5C, when camera-shake correcting lens 112 shifts from position A to position B during the moving of focus lens 113 for the DFD calculation, a region with high resolution changes, and thus reliable region R changes on observed image PA and reference image PB. That is to say, when the position of camera-shake correcting lens 112 shifts during the moving of focus lens 113 for the DFD calculation, a position of the reliable image region greatly differs in observed image PA and reference image PB. For this reason, controller 180 determines that a region, which is set according to information that represents the state of optical system 110 including the position of camera-shake correcting lens 112 on both observed image PA and reference image PB used for the completion of the Depth map, is the region that satisfies the predetermined standard as the detection accuracy of the object distance, namely, the reliable region.

Internal memory 240 stores the information that represents the region satisfying the predetermined standard as the detection accuracy of the object distance in relation with the state of optical system 110. That is to say, internal memory 240 stores the information that represents the region satisfying the predetermined standard as the detection accuracy of the object distance in relation with the resolution of optical system 110. Similarly, internal memory 240 stores the information that represents the region satisfying the predetermined standard as the detection accuracy of the object distance in relation with the position of zoom lens 111, an aperture value of iris 114, and the position of camera-shake correcting lens 112. Controller 180 reads these information form internal memory 240 according to the state of optical system 110, so as to be capable of determining the reliable region. At this time, controller 180 compares reliable region R on observed image PA with reliable region R on reference image PB, and determines reliable regions (overlapped regions) on both observed image PA and reference image PB. Controller 180 employs an object distance calculated based on the reliable region on both observed image PA and reference image PB. As a result, even when the state of optical system 110 changes on a process of the DFD calculation, a suitable DFD calculation result can be obtained.

Figure 6:
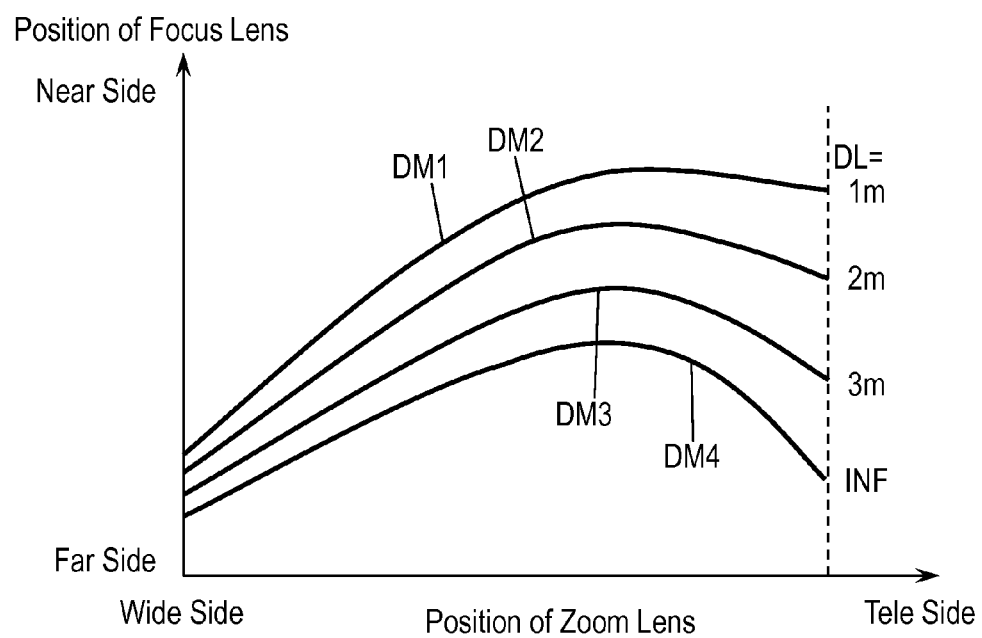
FIG. 6 is a zoom tracking table with respect to distances to plural object distances of the digital video camera in accordance with the embodiment.

Next, based on the object distance determined by the DFD calculation, controller 180 determines an in-focus position to which focus lens 113 is to move. To be more specific, controller 180 refers to a tracking table for calculating the in-focus position based on the determined object distance as well as a current position of zoom lens 111. FIG. 6 is the zoom tracking table for plural object distances of digital video camera 100 in accordance with the embodiment. As shown in FIG. 6, profiles DM1 to DM4 indicate in-focus positions corresponding to a position of zoom lens 111 for typical distances DL to an object (1 m, 2 m, 3 m, and infinite shown in FIG. 6). Controller 180 can calculate in-focus positions for object distances other than the typical object distances DL by interpolation to the profiles shown in FIG. 6 with respect to the object distances.

Controller 180 determines the in-focus position based on the calculated object distance and the zoom tracking table, and controls lens driver 120 to move focus lens 113 to the in-focus position as to cause focus lens 113 to focus on the object.

3. Effects

Digital video camera 100 according to the exemplary embodiment includes optical system 110 that includes focus lens 113 and forms an object image of an object, CMOS image sensor 140 that captures the object image formed via optical system 110 and generates image data, and controller 180. Controller 180 determines an object distance according to the information representing the state of optical system 110 based on first image data (observation image PA) generated when focus lens 113 is at a first focus lens position, and second image data (reference image PB) generated when focus lens 113 is at a second focus lens position. As a result, digital video camera 100 can determine an object image with higher accuracy according to the information representing the state of optical system 110.

Further, in digital video camera 100, controller 180 sets a first image region from the first image data (observed image PA) generated when focus lens 113 is at the first focus lens position based on the information representing the state of optical system 110 when focus lens 113 is at the first focus lens position. Similarly, controller 180 sets a second image region from the second image data (reference image PB) generated when focus lens 113 is at the second focus lens position based on information representing the state of optical system 110 when focus lens 113 is at the second focus lens position. Controller 180 determines the object distance using the first image data (observed image PA) and the second image data (reference image PB) that are overlapped with each other on the first image region and the second image region. As a result, even when two images with different defocusing amounts are intentionally created for the DFD calculation by changing an in-focus position, the Depth map can be created by using the reliable regions on the two images and an in-focus position can be determined. For this reason, the object distance can be determined with higher accuracy.

Digital video camera 100 treats the information representing the optical characteristics of optical system 110, the information on the position of zoom lens 111, the information on the aperture value of iris 114, and the information on the position of camera-shake correcting lens 112 as the information representing the state of optical system 110. As a result, the object distance can be determined with higher accuracy according to the optical characteristics of optical system 110, the position of zoom lens 111, the aperture value, and the position of camera-shake correcting lens 112.

4. Other Embodiments

In the above embodiment, an example of a technique disclosed in this patent application is described; however, the technique disclosed in this application is not limited to the above embodiment and is applicable to other embodiments with a change, replacement, supplement, or omission. The structural elements described in the embodiment can be combined for establishing a new embodiment.

The above exemplary embodiment describes the resolution of optical system 110, the position of zoom lens 111, the aperture value of iris 114, and the position of camera-shake correcting lens 112 as the state of optical system 110, but the present disclosure is not limited to them. Some of these described elements may be omitted, or another element showing the state of optical system 110 may be added.

According to the above embodiment, the point spread functions are stored in internal memory 240; however, the present disclosure is not limited to this structure, for instance, the point spread functions may be stored in a memory of image processor 160. Digital video camera 100 in accordance with the above embodiment selects sixteen point spread functions; however, the number of the selected point spread functions may be larger than sixteen or smaller than sixteen in response to the number of levels of the depth map.

The above exemplary embodiment describes an example where an autofocus operation is performed based on the DFD calculation result, but the present disclosure is not limited to this. For example, the present disclosure is applicable also to application software for displaying a map of the object distance on a display section based on the DFD calculation result. At this time, the map is displayed based on the object distance calculated based on the reliable regions on observed image PA and reference image PB. As a result, the map of the object distance can be displayed with higher accuracy.

The digital video camera that is the image-capturing apparatus according to the exemplary embodiment is a non-interchangeable lens digital video camera, but the digital video camera is not limited to this, and thus may be an interchangeable lens digital video camera. At this time, it goes without saying that the region on the captured image where the DFD calculation result is reliable changes according to resolution of a lens to be attached to the digital video camera.

The above exemplary embodiment describes an example where after the Depth map is created, a region on the created Depth map to be used is determined according to the state of optical system 110, but determination is not limited to this. That is to say, a region where the Depth map is created may be determined according to the state of optical system 110 at a stage of creating the Depth map.

In the above exemplary embodiment, results of convolving point spread functions PSF1 to PSF16 with observed pixel SA are checked against reference pixel SB, but the present disclosure is not limited to this. An omnifocal image that is focused with large depth is once generated from observed pixel SA and reference pixel SB, and results of convolving point spread functions PSF1 to PSF16 with the omnifocal image may be checked against reference pixel SB. Since an omnifocal image is focused with a large depth, the omnifocal image has contrast information with large depth, and thus S/N of the DFD calculation can be improved. For this reason, calculation accuracy of an in-focus position can be further improved. Further, the results of convolving point spread function PSF1 to PSF16 with this omnifocal image may be checked against not reference pixel SB but observed pixel SA. Since the position of the focus lens differs in observed pixel SA and reference pixel SB, different contrast information of the object is provided. For this reason, an object has contrast information on observed pixel SA, but an object does not have contrast information on reference pixel SB. In such a case, the results of convolving the point spread functions PSF1 to PSF16 with this omnifocal image are checked against observed pixel SA, so that a dynamic range in which the in-focus position can be determined by DFD calculation can be widened.

The above exemplary embodiment illustrates the case where controller 180 determines the object distance so that the region, which satisfies the predetermined standard on observed image PA and reference image PB used for the completion of the Depth map, is the reliable region, but the present disclosure is not limited to this. That is to say, a correction value that is stored in advance is used also for a region that is not determined as the reliable region, so that the region may be used as a region that indicates a beneficial object distance.

In the above embodiment, examples of the technique disclosed in the present disclosure are described with accompanying drawings and detailed descriptions. The structural elements in the drawings or the detailed descriptions include not only elements essential for problems to be solved but also other elements necessary for detailing the examples but not necessary for solving the problems. Although these elements not necessary for solving the problems are described here, they should not be construed as essential elements for the problems to be solved.

The above embodiments only describe examples of the technique disclosed in the present disclosure, so that various changes, replacements, supplements, or omissions are allowed in the scope of claims described later or an equivalent scope thereto.

The image-capturing apparatus of the present disclosure is applicable to digital video cameras, digital still cameras, portable-phones with camera function, or smart-phones with camera function.

What is claimed is:

1. An image-capturing apparatus comprising:
an optical system that forms an object image of an object, the optical system including a focus lens;
an image sensor that captures the object image formed via the optical system and generates image data; and
a controller that determines an object distance according to first information, which represents a degree of change in resolution, obtained by second information representing a state of the optical system, based on (i) first image data generated when the focus lens is at a first focus lens position and (ii) second image data generated when the focus lens is at a second focus lens position,
wherein the controller:
determines a first image region from the first image data without normalization of image magnification based on the first information when the focus lens is at the first focus lens position;
determines a second image region from the second image data without normalization of image magnification based on the first information when the focus lens is at the second focus lens position; and
determines the object distance using the first image data and the second image data in overlapped image regions of the first image region and the second image region.

2. The image-capturing apparatus according to claim 1, wherein
the second information includes information representing an optical characteristic of the optical system.

3. The image-capturing apparatus according to claim 1, wherein
the optical system includes a zoom lens, and
the second information includes information on a position of the zoom lens.

4. The image-capturing apparatus according to claim 1, wherein
the optical system includes an iris, and
the second information includes information on an aperture value of the iris.

5. The image-capturing apparatus according to claim 1, wherein
the optical system includes a camera shake correction lens, and
the second information includes information on a moving amount of the camera shake correction lens in a plane perpendicular to an optical axis of the optical system.

6. An image-capturing apparatus comprising:
an optical system that forms an object image of an object, the optical system including a focus lens;
an image sensor that captures the object image formed via the optical system and generates image data; and
a controller that determines an object distance according to first information, which represents a degree of change in resolution, obtained by second information representing a state of the optical system, based on (i) first image data generated when the focus lens is at a first focus lens position and (ii) second image data generated when the focus lens is at a second focus lens position,
wherein the controller:

determines a first image region from the first image data based on the first information when the focus lens is at the first focus lens position;

determines a second image region, which is different in location or size from the first image region, from the second image data based on the first information when the focus lens is at the second focus lens position; and determines the object distance using the first image data and the second image data in overlapped image regions of the first image region and the second image region.

* * * * *